(12) United States Patent
Dutta et al.

(10) Patent No.: US 8,379,639 B2
(45) Date of Patent: Feb. 19, 2013

(54) PACKET CLASSIFICATION

(75) Inventors: Debojyoti Dutta, Santa Clara, CA (US); Sumeet Singh, Mountain View, CA (US); Pradeep Sudame, Fremont, CA (US); Sundar Rajan, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 261 days.

(21) Appl. No.: 12/507,169

(22) Filed: Jul. 22, 2009

(65) Prior Publication Data

US 2011/0019667 A1 Jan. 27, 2011

(51) Int. Cl.
*H04L 12/28* (2006.01)

(52) U.S. Cl. ............ 370/389; 370/392; 726/22; 726/23

(58) Field of Classification Search .................. 370/351, 370/389, 392, 395.1, 395.3, 401
See application file for complete search history.

(56) References Cited

U.S. PATENT DOCUMENTS

| | | | |
|---|---|---|---|
| 7,096,498 B2 * | 8/2006 | Judge ........................... | 726/22 |
| 7,200,684 B1 * | 4/2007 | Schales et al. ................ | 709/252 |
| 7,227,842 B1 * | 6/2007 | Ji et al. .......................... | 370/235 |
| 7,343,485 B1 | 3/2008 | Huang et al. | |
| 7,458,098 B2 * | 11/2008 | Judge et al. ..................... | 726/23 |
| 7,464,407 B2 * | 12/2008 | Nakae et al. .................... | 726/22 |
| 7,525,958 B2 * | 4/2009 | Kumar et al. .................. | 370/386 |
| 7,535,909 B2 | 5/2009 | Singh et al. | |
| 7,734,752 B2 * | 6/2010 | Zuk et al. ....................... | 709/223 |
| 2005/0102414 A1 * | 5/2005 | Hares et al. ..................... | 709/232 |
| 2006/0098652 A1 | 5/2006 | Singh et al. | |
| 2006/0161986 A1 | 7/2006 | Singh et al. | |
| 2007/0127483 A1 | 6/2007 | Gilon et al. | |
| 2008/0186974 A1 | 8/2008 | Singh et al. | |
| 2009/0092136 A1 * | 4/2009 | Nazareth et al. .............. | 370/392 |

OTHER PUBLICATIONS

PCT Search Report and Written Opinion for Serial No. PCT/US2010/042939 dated Sep. 16, 2010.

* cited by examiner

*Primary Examiner* — Dang Ton
*Assistant Examiner* — Brian O Connor
(74) *Attorney, Agent, or Firm* — Patterson & Sheridan, LLP

(57) ABSTRACT

Apparatuses, methods, and other embodiments associated with packet identification are described. One example apparatus includes a packet selection logic to identify packets associated with a data stream. The example apparatus may also include a set of packet classification logics. A packet classification logic may generate a signal as a function of whether an attribute associated with the packet matches an attribute associated with packets generated by a tested application.

21 Claims, 5 Drawing Sheets

PACKET CLASSIFICATION

TECHNICAL FIELD

This disclosure relates generally to computer networking.

BACKGROUND

Routers throughout networks (e.g., the Internet), may be configured to process network traffic based on information contained in the network traffic. For example, some companies have tried to manipulate quality of service settings for packets associated with file sharing applications. Conventional methods may attempt deep packet inspection (DPI) to detect an application with which a packet is associated. DPI is the act of examining packet payload contents. However, DPI may have difficulty determining what application a packet is associated with when the payload is encrypted. Additionally, DPI may be slow and/or resource intensive (e.g., memory, processing). Thus, regular use of DPI may introduce latency in network devices causing network slowdowns and reducing data transfer speeds. Further, some DPI implementations may have high false positive rates, and false negatives may be introduced by manipulating packet payloads with polymorphic techniques (e.g., computer viruses that rewrite their code).

Some routers use statistical classification techniques to augment other classification techniques instead of using DPI. However, some conventional statistical classification techniques that use software for gathering data are computationally high cost, slow, and therefore impractical for some typical classification scenarios. Additionally, some conventional statistical classification techniques do not reach a conclusion about a given data stream until after the stream has terminated.

BRIEF DESCRIPTION OF THE DRAWINGS

The accompanying drawings, which are incorporated in and constitute a part of the specification, illustrate various example systems, methods, and other example embodiments. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DESCRIPTION OF EXAMPLE EMBODIMENTS

Overview

Figure 1:
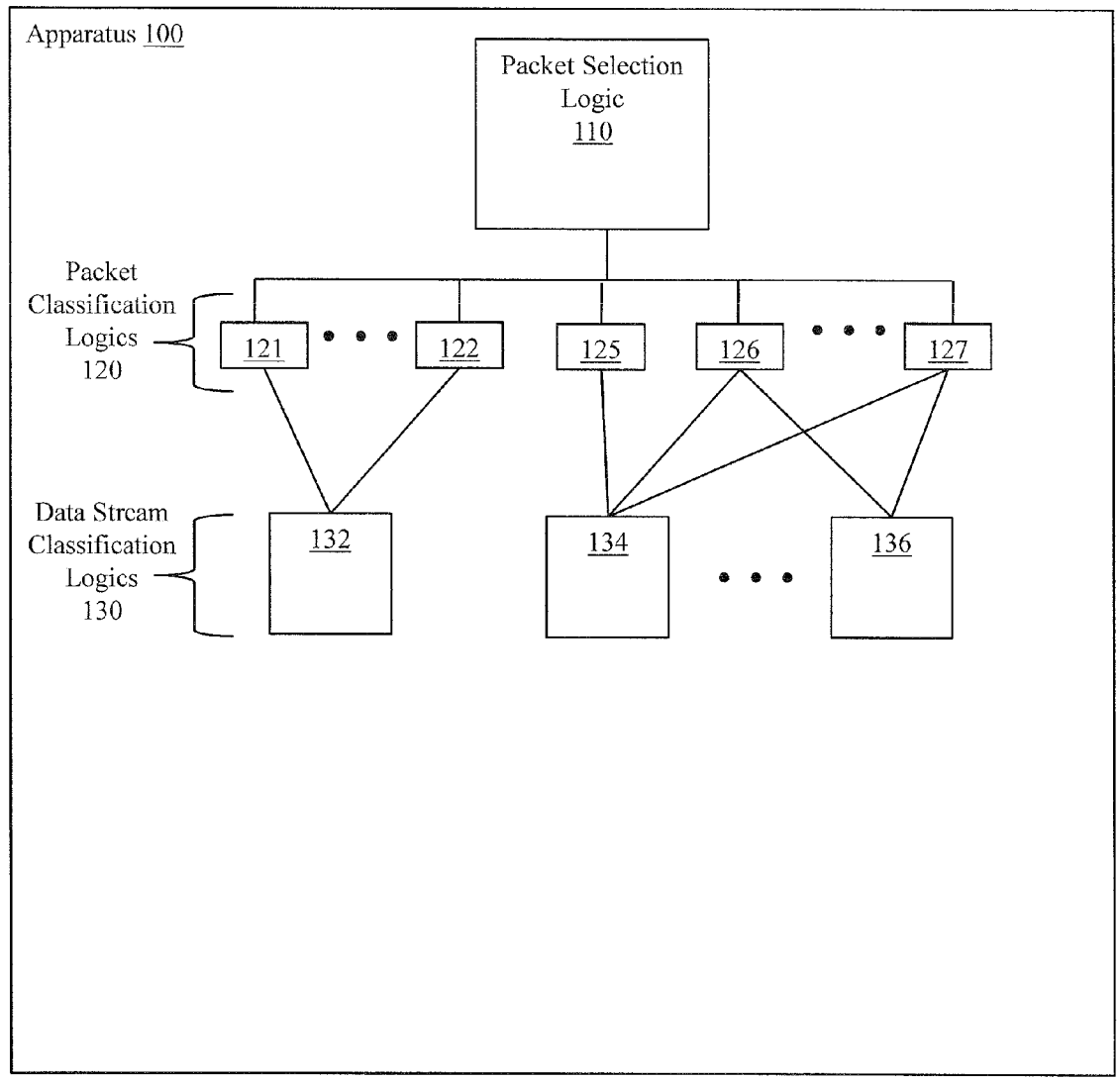
FIG. 1 illustrates an example apparatus associated with packet classification.

In one embodiment an apparatus includes a packet selection logic to identify a packet associated with a data stream. The data stream comprises a sequence of packets transmitted from a source device to a destination device, and where the data stream is associated with an application. The apparatus also includes a set of packet classification logics. A packet classification logic generates a signal as a function of whether an attribute associated with the packet matches an attribute associated with packets generated by a tested application. Members of the set of packet classification logics operate in parallel. The apparatus also includes a set of data stream classification logics. A data stream classification logic provides a signal identifying a likelihood that the data stream is associated with an application based, at least in part, on one or more signals from members of the set of packet classification logics.

In one embodiment a method includes providing data associated with a packet from a data stream to a set of packet attribute detectors. A packet attribute detector returns a signal as a function of whether data derived from the packet corresponds to training data generated from packets originating from a tested application. The method also includes providing a signal describing a likelihood that the data stream is associated with an identified application based, at least in part, on one or more signals from members of the set of packet attribute detectors.

Description

Apparatuses and methods associated with packet classification are described. One example apparatus includes a set of packet classification logics. When a packet classification logic is provided with data associated with a packet from a data stream, the packet classification logic may generate a signal as a function of whether the data associated with the packet matches data associated with packets generated by a tested application. Signals from packet classification logics may then be interpreted by data stream classification logics. Data stream classification logics may provide a signal describing a likelihood that the data stream is associated with an application based on the signals from the packet classification logics. In one example, signals from data stream classification logics may be interpreted by an aggregation logic to explicitly associate (e.g., provide a signal, store a value) a data stream and an application.

In one example, packet classification logics and data stream classification logics may be implemented as hardware. This may allow the logics to operate substantially in parallel, facilitating more packets and/or data streams to be classified over a given time period. Fast classification of packets and data streams may enhance logics that manipulate data associated with data streams. For example, a quality of service logic receiving data from a parallel processing hardware implemented packet classifier may be able to adjust quality of service values for more data streams than a quality of service logic receiving data from a packet classifier implemented in software.

Figure 3:
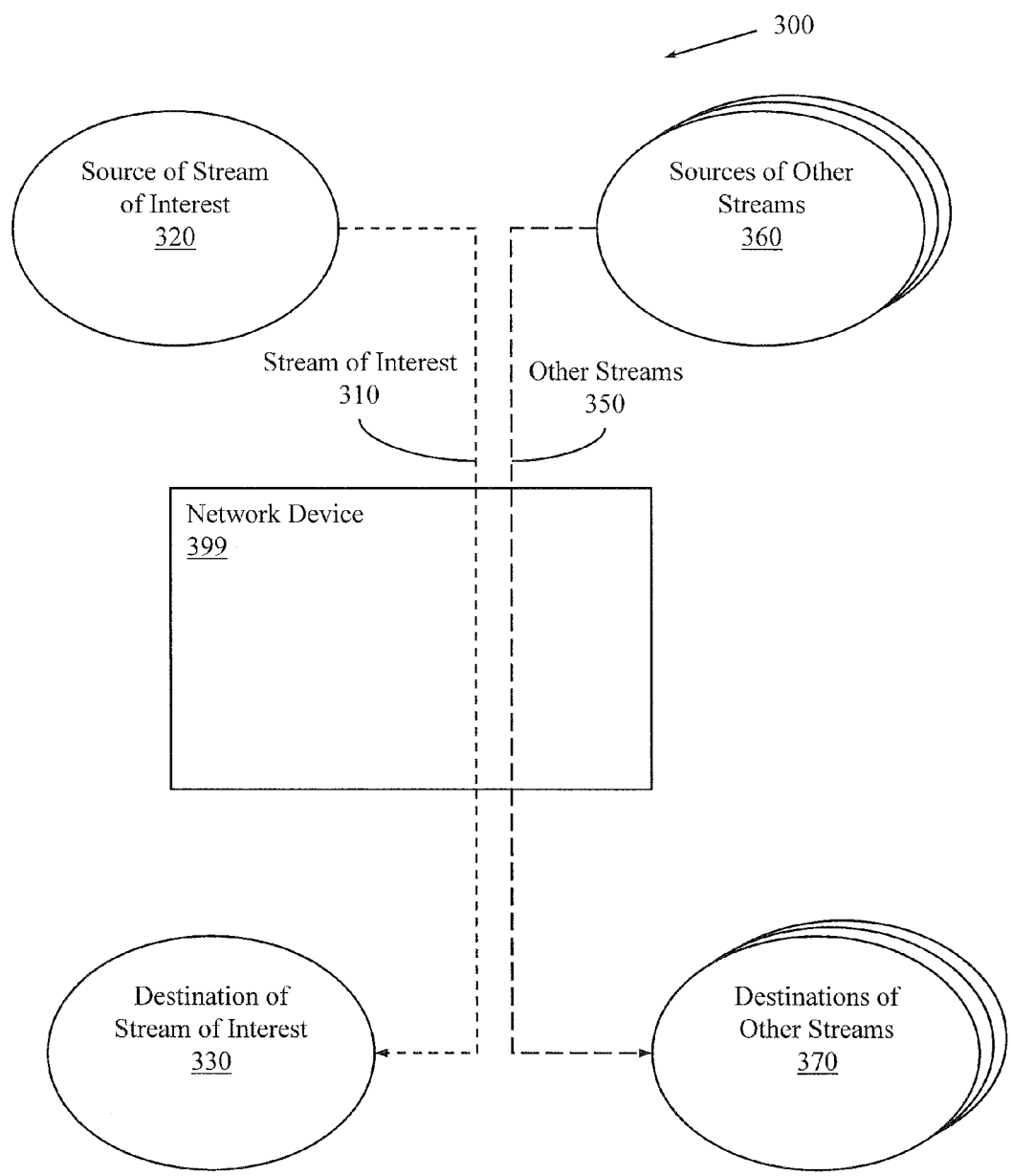
FIG. 3 illustrates an example network in which example systems and methods, and equivalents, may operate.

The term "data stream", as used herein refers to a sequence of packets transmitted from a source device to a destination device. A data stream is also associated with an application. By way of illustration, FIG. 3 illustrates an example network 300 in which example systems and methods, and equivalents, may operate. The network 300 may include a network device 399. Network device 399 may process multiple data streams simultaneously including a stream of interest 310. The stream of interest 310 may be provided by a source 320 of the stream of interest to a destination 330 of the stream of interest. The network device 399 may also be processing other streams 350 that are being provided by sources 360 of the other streams to destinations 370 of the other streams. In one example, there may be additional data streams initiating and/or terminating from the source 320 of the stream of interest and/or the destination 330 of the stream of interest that are passing through network device 399. While one stream of interest 310 is described, a person having ordinary skill in the art can see how there may be multiple streams of interest starting at source 320 and arriving at destination 330. A person having ordinary skill in the art can also see how some of these multiple streams may share an application but still be different streams (e.g., two different file transfers, separate audio and video data streams).

In one example, a data stream may be described by a 5-tuple flow definition. The 5-tuple flow definition may uniquely identify a data stream. However, as described above, two streams from the same source going to the same destination associated with the same application may share the same 5-tuple flow definition. In this case, an additional differentiator (e.g., tracking packet numbering) may be used to differentiate the data streams.

FIG. 1 illustrates an apparatus 100 associated with packet classification. Apparatus 100 includes a packet selection logic 110. Packet selection logic 110 may identify a packet associated with a data stream. The data stream comprises a sequence of packets transmitted from a source device to a destination device. The data stream is also associated with an application. Data streams are described in greater detail above. Identifying packets associated with the data stream may comprise comparing a set of state data associated with the packet to a 5-tuple flow definition that describes the data stream.

Figure 2:
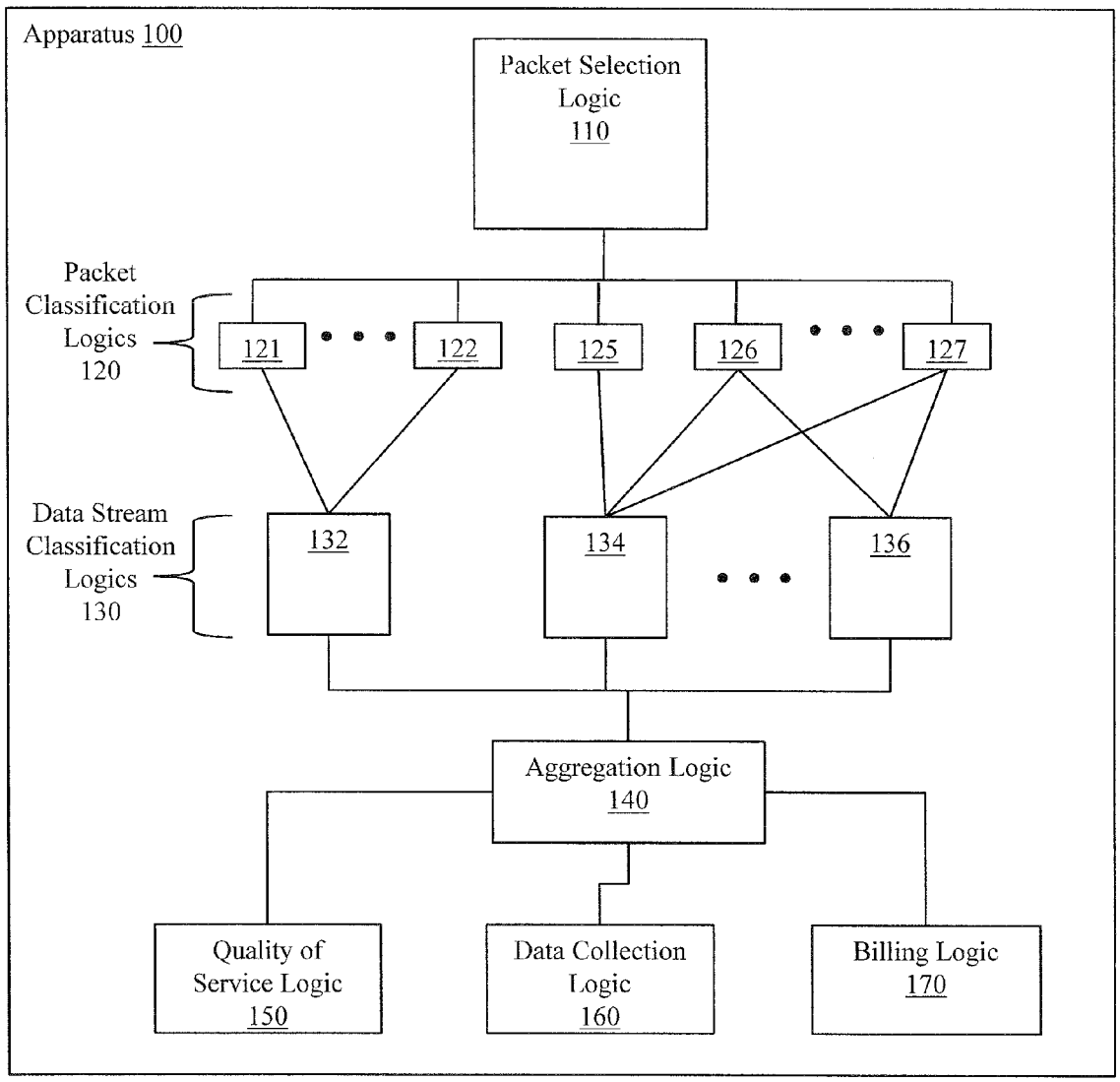
FIG. 2 illustrates an example apparatus associated with packet classification.

"Logic", as used in reference to FIGS. 1 and 2, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Apparatus 100 also includes a set 120 of packet classification logics. A member of the set 120 of packet classification logics may generate a signal as a function of whether an attribute associated with the packet matches an attribute associated with packets generated by a tested application. Members of the set 120 of packet classification logics may operate in parallel. In one example, signals generated by packet classification logics may be binary signals. A binary signal is a signal that may have one of two values. By way of illustration, a packet classification logic emitting a first value may indicate that a packet does have an attribute tested by the classification logic, and the packet classification logic emitting a second value may indicate that the packet does not have the attribute tested by the classification logic. Attributes tested by packet classification logics may include, for example, packet size, packet arrival rate, source port, destination port, and protocol. Additionally, attributes may be tested for a specific value or for a range of values. In one example, members of the set of packet classification logics may be embodied in an application specific integrated circuit(s) (ASIC), a field programmable gate array(s) (FPGA), a multi-core central processing unit(s) (CPU), or a multi-core digital signal processor(s) (DSP).

"Signal", as used herein, includes but is not limited to, electrical signals, optical signals, analog signals, digital signals, data, computer instructions, processor instructions, messages, a bit, and a bit stream that can be received, transmitted and/or detected.

Apparatus 100 also includes a set 130 of data stream classification logics. A member of the set 130 of data stream classification logics may provide a signal identifying a likelihood that the data stream is associated with an application. The signal may be provided based on signals from members of the set of packet classification logics. Members of the set 130 of data stream classification logics may be connected to members of the set 120 of packet classification logics in different configurations. Apparatus 100 shows a first configuration where a group packet classification logics (121-122) provide signals to a single data stream classification logic 132. Apparatus 100 also shows a second configuration where members of a group of packet classification logics (125-127) provide signals to one or more data stream classification logics (134-136). The second configuration may be advantageous when multiple tested applications share a similar property. By allowing a single packet classification logic to provide signals to more than one data stream classification logic, processing resources (e.g., memory, chip space) may be conserved. While two configurations are described, a person having ordinary skill in the art may recognize other configurations that may be appropriate. Further, while members of the set 120 of packet classification logics are shown in parallel, in some situations it may be appropriate for some members to operate in serial.

FIG. 2 illustrates additional detail about apparatus 100. The embodiment of apparatus 100 illustrated in FIG. 2 includes a packet selection logic 110 to select packets from a data stream, a set 120 of packet classification logics and a set 130 of data stream classification logics. The embodiment of apparatus 100 illustrated in FIG. 2 also includes an aggregation logic 140. Aggregation logic 140 may receive signals from members of the set 130 of data stream classification logics. Aggregation logic 140 may also assign a data stream classifier to the data stream. The data stream classifier may be assigned based on signals from members of the set of data stream classification logics. In one example, the data stream classifier may associate the data stream with an identified application. The identified application may be, for example, a voice over internet protocol (VoIP) application, a file sharing application, a file transfer protocol (FTP) application, an internet browser, a chat application, a gaming application, a video application, an audio application, or a conferencing application. In one example, assigning the data stream classifier may comprise storing an association between the data stream classifier and the data stream. In another example, assigning the data stream classifier may comprise providing a signal that identifies the data stream classifier and the data stream.

The embodiment of apparatus 100 illustrated in FIG. 2 also illustrates several example action logics including quality of service logic 150, data collection logic 160, and billing logic 170. An action logic may perform an action associated with the data stream based on the data stream classifier. For example, quality of service logic 150 may modify a quality of service setting for the data stream based on the data stream classifier, data collection logic 160 may collect data about the data stream, and billing logic 170 may update billing data associated with the identified application. While three example action logics are described, a person having ordinary skill in the art may recognize additional logics that may be enhanced by data identifying an application with which a data stream is associated.

By way of illustration, a company that manages routers may have an agreement with a voice over internet protocol (VoIP) phone company. The agreement may involve providing an increased quality of service (e.g., increased priority, reduced packet drop rate) to VoIP packets from an application managed by the VoIP phone company at a slightly increased data transfer cost. To detect data streams associated with the application, the VoIP phone company may install a hardware chip that includes parallel operators that aid in the detection of packets from the application. When a data stream from the application passes through the router, the chip may begin to indicate that packets from the data stream have a high likelihood of being associated with the application. This may allow the router to associate the data stream with the application of the phone company, facilitating improving the quality of service for the packets and billing the VoIP phone company at an increased rate for the amount of data transferred.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic. The physical manipulations create a concrete, tangible, useful, real-world result.

It has proven convenient at times, principally for reasons of common usage, to refer to these signals as, for example, bits, values, elements, symbols, characters, terms, and numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
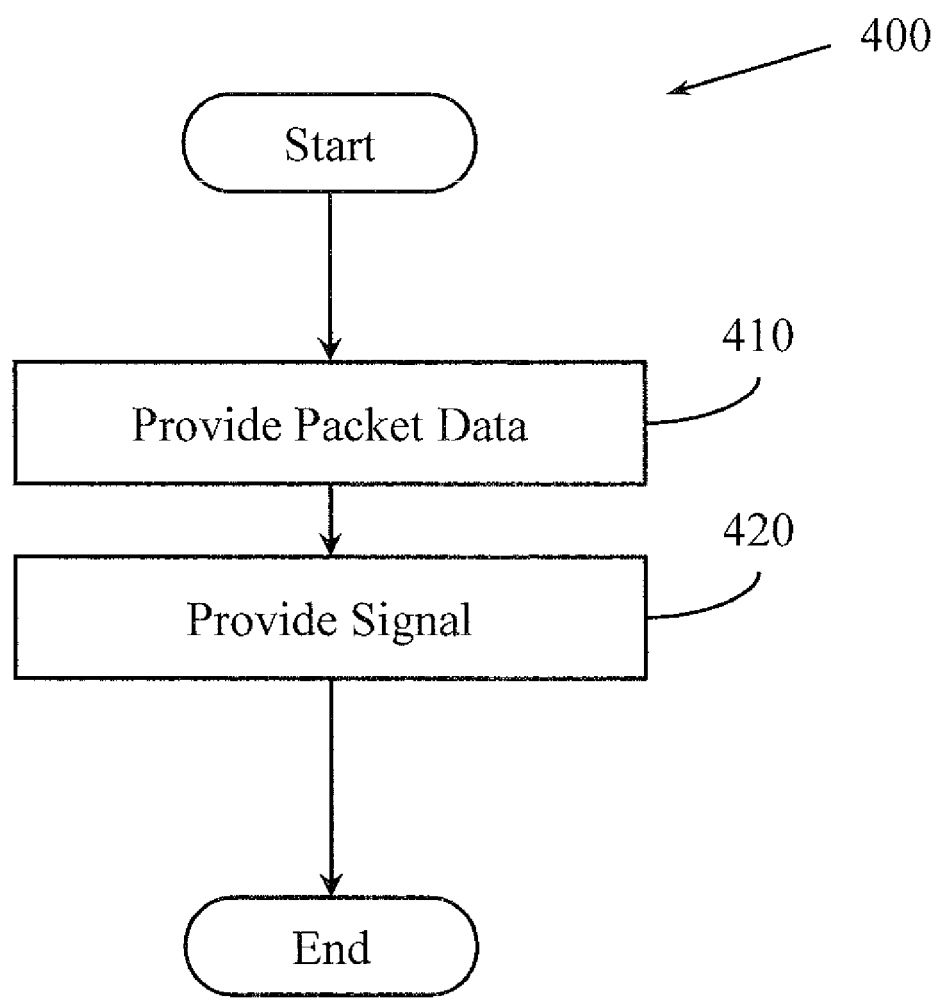
FIG. 4 illustrates an example method associated with packet classification.

FIG. 4 illustrates a method 400 associated with packet classification. Method 400 includes, at 410, providing data associated with a packet from a data stream to a set of packet attribute detectors. As described above, a data stream may be a sequence of packets transmitted from a source device to a destination device. The data stream may also be associated with an application. A member of the set of packet attribute detectors may return a signal as a function of whether data derived from the packet corresponds to training data generated from packets originating from a tested application. In one example, members of the set of packet attribute detectors may operate in parallel. However, a person having ordinary skill in the art may see how it may be appropriate for some members of the set of packet attribute detectors to operate in serial.

Method 400 also includes, at 420, providing a signal describing a likelihood that the data stream is associated with an identified application. The signal describing the likelihood may facilitate assigning a data stream classifier to the data stream. Thus, the data stream classifier may associate the data stream with the identified application. Further, the data stream classifier may facilitate modifying a value and/or recording data associated with the identified application and/or the data stream. The likelihood may be based on one or more signals from members of the set of packet attribute detectors. As described above, the identified application may be a voice over internet protocol (VoIP) application, a file sharing application, an http application, or a streaming media application.

Thus, FIG. 4 illustrates how, for example, the chip installed by the company that manages routers described above may operate. While a hardware chip is described, a person having ordinary skill in the art can see how a software solution may be appropriate for some situations (e.g., easier to install new software than a hardware chip). By performing analysis of packets that does not rely on deep packet inspection, accurate, real-time packet and data stream classification may be achieved.

While FIG. 4 illustrates various actions occurring in serial, it is to be appreciated that various actions illustrated in FIG. 4 could occur substantially in parallel. By way of illustration, a first process could provide data to a packet attribute detector, and a second process could provide a signal describing a likelihood that the data stream is associated with an identified application. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

A "computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a tangible media may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 5:
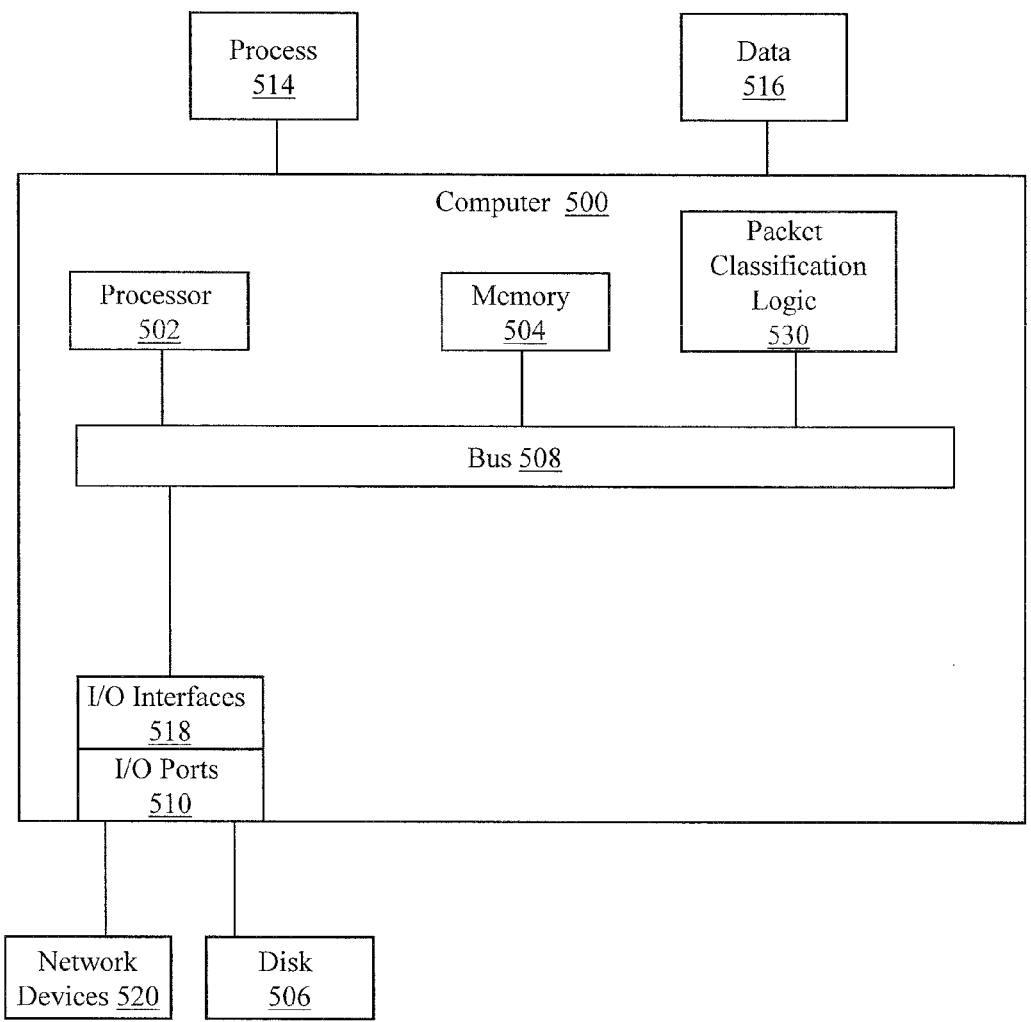
FIG. 5 illustrates an example computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a packet classification logic 530 configured to facilitate identifying an application associated with a data stream. In different examples, the logic 530 may be implemented in hardware, software, firmware, and/or combinations thereof. While the logic 530 is illustrated as a hardware component attached to the bus 508, it is to be appreciated that in one example, the logic 530 could be implemented in the processor 502.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Logic 530 may provide means (e.g., hardware, software, firmware) for providing data associated with a packet from a data stream to a set of packet attribute detectors. A member of the set of packet attribute detectors may return a signal as a function of whether an attribute associated with the packet matches an attribute associated with packets generated by a tested application. Logic 530 may also provide means (e.g., hardware, software firmware) for providing a signal describing a likelihood that the data stream is associated with an identified application. The signal may be provided based on signals from members of the set of packet attribute detectors. The means associated with logic 530 may be implemented, for example, as an ASIC. The means may also be implemented as computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multiprocessor architectures. A memory 504 may include volatile memory and/or non-volatile memory. Non-volatile memory may include, for example, ROM, and PROM. Volatile memory may include, for example, RAM, SRAM, and DRAM.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, and a memory stick. Furthermore, the disk 506 may be a CD-ROM drive, a CD-R drive, a CD-RW drive, a DVD ROM drive, a Blu-Ray drive, and an HD-DVD drive. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, and the network devices 520. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems and methods have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems and methods described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, MB, MBB, AABBC, AABBCC (e.g., the data store may store only A, only B, only C, A&B, A&C, B&C, A&B&C, A&A&A, A&A&B, A&A&B&B, A&A&B&B&C, A&A&B&B&C&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. An apparatus configured to classify a data stream as belonging to a distinct application in order to facilitate prioritization of traffic of a plurality of distinct applications, the apparatus comprising:

a packet selection logic embodied in hardware to identify a plurality of packets of a data stream, wherein the data stream comprises a sequence of packets transmitted from a source device to a destination device and is associated with at least one of a plurality of distinct applications, wherein the data stream is associated with a first application, a second application, and a third application;

a set of packet classification logics embodied in hardware, wherein a member of the set of packet classification logics generates a signal as a function of whether an attribute associated with the packets matches an attribute associated with packets generated by an application having been tested to confirm that its behavior conforms to a predefined set of specifications, wherein the tested application is separate from the first application, the second application, and the third application, and wherein members of the set of packet classification logics operate in parallel; and a set of data stream classification logics embodied in hardware, wherein a member of the set of data stream classification logics provides a signal identifying a respective measure of likelihood that the data stream is associated with each of: (i) the first application, (ii) the second application, and (iii) the third application, based, at least in part, on one or more signals from members of the set of packet classification logics;

wherein the data stream is identified as having: (i) a first measure of likelihood of belonging to the first application, (ii) a second measure of likelihood of belonging to the second application, and (iii) a third measure of likelihood of belonging to the third application, in order to facilitate prioritization of traffic of the first application relative to traffic of the second application and the third application, wherein each of the measures of likelihood are independent;

wherein each of the first application, the second application, and the third application are selected from: (i) a voice over internet protocol (VoIP) application, (ii) a file sharing application, (iii) a file transfer protocol (FTP) application, (iv) an internet browser, (v) a chat application, (vi) a gaming application, (vii) a video application, (viii) an audio application, and (ix) a conferencing application.

2. The apparatus of claim 1, comprising an aggregation logic embodied in hardware to receive signals from members of the set of data stream classification logics, and to assign a data stream classifier to the data stream based, at least in part, on signals from members of the set of data stream classification logics, wherein the data stream classifier associates the data stream with the first application, the second application, and the third application.

3. The apparatus of claim 2, wherein assigning the data stream classifier to the data stream comprises storing an association between the data stream classifier and the data stream.

4. The apparatus of claim 3, wherein assigning the data stream classifier to the data stream comprises providing a signal identifying the data stream classifier and the data stream.

5. The apparatus of claim 4, comprising an action logic embodied in hardware to perform an action associated with the data stream based, at least in part, on the data stream classifier.

6. The apparatus of claim 5, wherein the action logic is a quality of service logic embodied in hardware and wherein the action comprises modifying a quality of service setting for the data stream.

7. The apparatus of claim 6, wherein the action logic is a data collection logic embodied in hardware and wherein the action comprises collecting data about the data stream.

8. The apparatus of claim 7, wherein the action logic is a billing logic embodied in hardware, and wherein the action comprises updating billing data associated with the first application.

9. The apparatus of claim 8, wherein identifying packets associated with the data stream comprises comparing a set of state data associated with the packet to a 5-tuple flow definition that describes the data stream.

10. The apparatus of claim 9, wherein a signal that a member of the set of packet classification logics generates is a binary signal.

11. The apparatus of claim 10, wherein the attribute is associated with one or more of, a packet size, a packet arrival rate, a source port, a destination port, and a protocol.

12. The apparatus of claim 11, wherein a member of the set of packet classification logics is embodied in one of, an application specific integrated circuit, a field programmable gate array, a multi-core central processing unit, and a multi-core digital signal processor;

wherein each measure of likelihood comprises a numerical measure of likelihood within a predefined range of numerical measures of likelihood; and wherein the traffic of the second and third applications is not classified as belonging to the first application.

13. A method to classify a data stream as belonging to a distinct application in order to facilitate prioritization of traffic of a plurality of distinct applications, the method comprising:

providing data associated with a packet from a first data stream to a set of packet attribute detectors, wherein the data stream is associated with at least one of a plurality of distinct applications, wherein a member of the set of packet attribute detectors returns a signal as a function of whether data derived from the packet corresponds to training data generated from packets originating from an application having been tested to confirm that its behavior conforms to a predefined set of specifications, wherein the data stream is associated with a first application, a second application, and a third application, wherein the tested application is separate from the first application, the second application, and the third application, wherein members of the set of packet attribute detectors operate in parallel; and providing a signal describing a respective likelihood that the first data stream is associated with: (i) the first application, (ii) the second application, and (iii) the third application, based, at least in part, on one or more signals from members of the set of packet attribute detectors;

wherein the data stream is identified as having: (i) a first measure of likelihood of belonging to the first application, (ii) a second measure of likelihood of belonging to the second application, and (iii) a third measure of likelihood of belonging to the third application, in order to facilitate prioritization of traffic of the first application relative to traffic of the second application and the third application, wherein each of the measures of likelihood are independent, wherein each of the first application, the second application, and the third application are selected from: (i) a voice over internet protocol (VoIP) application, (ii) a file sharing application, (iii) a file transfer protocol (FTP) application, (iv) an internet browser, (v) a chat application, (vi) a gaming application, (vii) a video application, (viii) an audio application, and (ix) a conferencing application.

14. The method of claim 13, wherein the data stream is a sequence of packets transmitted from a source device to a destination device.

15. The method of claim 13, further comprising:

receiving signals from members of the set of packet attribute detectors; and assigning a data stream classifier to the data stream based, at least in part, on signals from members of the set of data stream classification logics, wherein the data stream classifier associates the data stream with the first application, the second application, and the third application.

16. The method of claim 13, wherein the signal describing the likelihood that the first data stream is associated with the first application, the second application, and the third application facilitates assigning a data stream classifier to the data stream, wherein the data stream classifier associates the data stream with the identified application.

17. The method of claim 16, wherein the data stream classifier facilitates one of: (i) modifying a value associated with one of, the first application, the second application, the third application, and the data stream, and (ii) recording data associated with one of, the first application, the second application, the third application, and the data stream.

18. A system, comprising:
means for providing data associated with a packet from a data stream to a set of packet attribute detectors, wherein the data stream is associated with at least one of a plurality of distinct applications, wherein a member of the set of packet attribute detectors returns a signal as a function of whether an attribute associated with packets generated by an application having been tested to confirm that its behavior conforms to a predefined set of specifications, wherein the data stream is associated with a first application, a second application, and a third application, separate from the tested application, wherein members of the set of packet attribute detectors operate in parallel; and
means for providing a signal describing a likelihood that the first data stream is associated with the first application, the second application, and the third application, based, at least in part, on one or more signals from members of the set of packet attribute detectors;
wherein the data stream is identified as having a first measure of likelihood of belonging to the first application, in order to facilitate prioritization of traffic of the first application relative to traffic of the second application and the third application, wherein each of the measures of likelihood are independent,
wherein each of the first application, the second application, and the third application are selected from the group comprising: (i) a voice over internet protocol (VoIP) application, (ii) a file sharing application, (iii) a file transfer protocol (FTP) application, (iv) an internet browser, (v) a chat application, (vi) a gaming application, (vii) a video application, (viii) an audio application, and (ix) a conferencing application.

19. The system of claim 18, further comprising:
receiving signals from members of the set of packet attribute detectors; and
assigning a data stream classifier to the data stream based, at least in part, on signals from members of the set of data stream classification logics, wherein the data stream classifier associates the data stream with the first application, the second application, and the third application.

20. A non-transitory computer-readable medium storing computer executable instructions that when executed by a computer control the computer to perform a method, the method comprising:
providing data associated with a packet from a first data stream to a set of packet attribute detectors, wherein the data stream is associated with at least one of a plurality of distinct applications, wherein a member of the set of packet attribute detectors returns a signal as a function of whether an attribute associated with packets generated by an application having been tested to confirm that its behavior conforms to a predefined set of specifications, wherein the data stream is associated with a first application, a second application, and a third application, separate from the tested application, wherein members of the set of packet attribute detectors operate in parallel; and
providing a signal describing a likelihood that the data stream is associated with the first application, the second application, and the third application, based, at least in part, on one or more signals from members of the set of packet attribute detectors;
wherein the data stream is identified as having a first measure of likelihood of belonging to the first application, in order to facilitate prioritization of traffic of the first application relative to traffic of the second application and the third application, wherein each of the measures of likelihood are independent,
wherein each of the first application, the second application, and the third application are selected from the group comprising: (i) a voice over internet protocol (VoIP) application, (ii) a file sharing application, (iii) a file transfer protocol (FTP) application, (iv) an internet browser, (v) a chat application, (vi) a gaming application, (vii) a video application, (viii) an audio application, and (ix) a conferencing application.

21. The computer-readable storage medium of claim 20, further comprising:
receiving signals from members of the set of packet attribute detectors; and
assigning a data stream classifier to the data stream based, at least in part, on signals from members of the set of data stream classification logics, wherein the data stream classifier associates the data stream with the first application, the second application, and the third application.

* * * * *

UNITED STATES PATENT AND TRADEMARK OFFICE
CERTIFICATE OF CORRECTION

PATENT NO. : 8,379,639 B2
APPLICATION NO. : 12/507169
DATED : February 19, 2013
INVENTOR(S) : Dutta et al.

It is certified that error appears in the above-identified patent and that said Letters Patent is hereby corrected as shown below:

In the Specifications:

In the Description of Example Embodiments:

Column 8, Line 41, please delete "MB,MBB," and insert --AAB, AABB,-- therefor;

In the Claims:

Column 10, Claim 13, Line 22, please delete "first";

Column 11, Claim 16, Line 4, please delete "first";

Column 11, Claim 18, Line 31, please delete "first"; (1st occurrence).

Column 12, Claim 20, Line 10, please delete "first".

Signed and Sealed this
Fourteenth Day of May, 2013

Teresa Stanek Rea
*Acting Director of the United States Patent and Trademark Office*